US006027599A

United States Patent [19]

Wang

[11] Patent Number: 6,027,599

[45] Date of Patent: Feb. 22, 2000

[54] METHOD FOR MANUFACTURING KNOCKDOWN SAFETY SOFT FLOOR TILE

[76] Inventor: Wen-Lung Wang, No. 85, Wu-Fu Road, Wu-Feng Hsiang, Taichung Hsien, Taiwan

[21] Appl. No.: 09/078,109

[22] Filed: May 13, 1998

Related U.S. Application Data

[63] Continuation-in-part of application No. 08/791,423, Jan. 30, 1997, abandoned.

[51] Int. Cl.[7] ................................ B32B 31/00; B44C 1/16

[52] U.S. Cl. ........................... 156/258; 156/230; 156/239; 156/240; 156/281

[58] Field of Search ..................................... 156/230, 239, 156/240, 258, 281

[56] References Cited

U.S. PATENT DOCUMENTS 4,172,168 10/1979 Klaffke et al. .
4,253,896 3/1981 Appleyard et al. .
4,452,604 6/1984 Lenox et al. .
4,462,853 7/1984 Ringer .
4,689,259 8/1987 Miller, Jr. et al. .
5,834,081 11/1998 Fanti .

*Primary Examiner*—Curtis Mayes
*Attorney, Agent, or Firm*—Rosenberg, Klein & Lee

[57] ABSTRACT

A method for manufacturing knockdown safety soft floor tiles. The method includes steps of cleaning up an oil layer on the surface of the EVA board, using photography to print a predetermined picture on transfer printing paper, attaching the transfer printing paper with the picture to the surface of the EVA board, rolling and compressing the transfer printing paper with a high temperature roller, tearing away the transfer printing paper and leaving the picture on the EVA board and cutting the EVA board to have predetermined dimensions defining a floor tile.

6 Claims, 5 Drawing Sheets

METHOD FOR MANUFACTURING KNOCKDOWN SAFETY SOFT FLOOR TILE

CROSS-REFERENCE TO RELATED APPLICATIONS

This application is a Continuation-In-Part application of Ser. No. 08/791,423, filed Jan. 30, 1997, and entitled "A Method For Manufacturing Knockdown Safety Soft Floor Tile And A Product Thereof, now abandoned."

BACKGROUND OF THE INVENTION

The present invention relates to a method for manufacturing knockdown safety soft floor tile and a product thereof.

The existing knockdown floor tile such as wooden floor tile has quite good quality and elegant color and is durable. However, such floor tile is quite expensive and too hard and slippery. Therefore, a child or an old-timer is apt to fall down when walking on such floor tile. Moreover, it is difficult to partially repair or replace such floor tile and an expert is needed to pave the floor tile.

Also, a not knockdown type of thin plastic floor sheet is commercially available. Such plastic floor sheet has fair quality and can be paved as an integral unit. However, still an expert is needed to pave such plastic floor sheet (including painting adhesive on the floor, cutting the floor sheet, etc.). Moreover, such plastic floor sheet is subject to crimping and detachment on the corners or at the adjoining sections due to humidity and thermal expansion/contraction. In addition, in the case of damage of a part of the floor sheet, the entire floor sheet must be replaced. This is time-consuming and laborious.

Another knockdown type of plastic floor tile has low price and can be easily assembled and replaced. However, such floor tile has poor quality and monotonous color. Furthermore, the surface of such floor tile is printed with monotonous and simple pictures by halftone block printing and it is impossible to create more complicated colorful pictures or grain-imitative pictures. In addition, after a period of use, the original picture of such plastic floor tile is apt to be scraped off. This leads to a poor appearance of the floor tile.

SUMMARY OF THE INVENTION

To obviate the above problems, it is a primary object of the present invention to provide a method for manufacturing knockdown safety soft floor tile and a product thereof. According to the method, the floor tile can be easily and quickly manufactured and the surface of the floor tile can be printed with the picture of wooden grain, stone stripes, a sight, a portrait or cartoon character or a photograph. Also, the picture printed on the floor tile is securely adhered thereto without easy detachment.

It is a further object of the present invention to provide the above method and product in which the floor tile is soft to create a safe and comfortable living environment.

It is still a further object of the present invention to provide the above method and product in which the floor tile is of knockdown type and can be assembled by the purchaser himself according to the profile of the room.

It is still a further object of the present invention to provide the above method and product in which the floor tile is made of EVA (foam) material which is able to absorb sound to reduce the noise produced when walking.

It is still a further object of the present invention to provide the above method and product in which the EVA material serves to keep warm.

To achieve the above objects, the method of the present invention includes the steps of:

first step: preparing an EVA board having a surface with irregular slipproof stripes (or a plane surface) and preparing a transfer printing paper;

second step: cleaning up the oil layer on the surface of the EVA board and then using photography to print predetermined picture on the transfer printing paper;

third step: attaching the transfer printing paper with the picture to the surface of the EVA board;

fourth step: rolling and compressing the transfer printing paper with a high temperature roller;

fifth step: tearing away the transfer printing paper and leaving the picture on the EVA board; and, sixth step: cutting the EVA board into predetermined dimension as a floor tile product.

The present invention can be best understood through the following description and accompanying figures, wherein:

DETAILED DESCRIPTION OF THE PREFERRED EMBODIMENT

Figure 1:
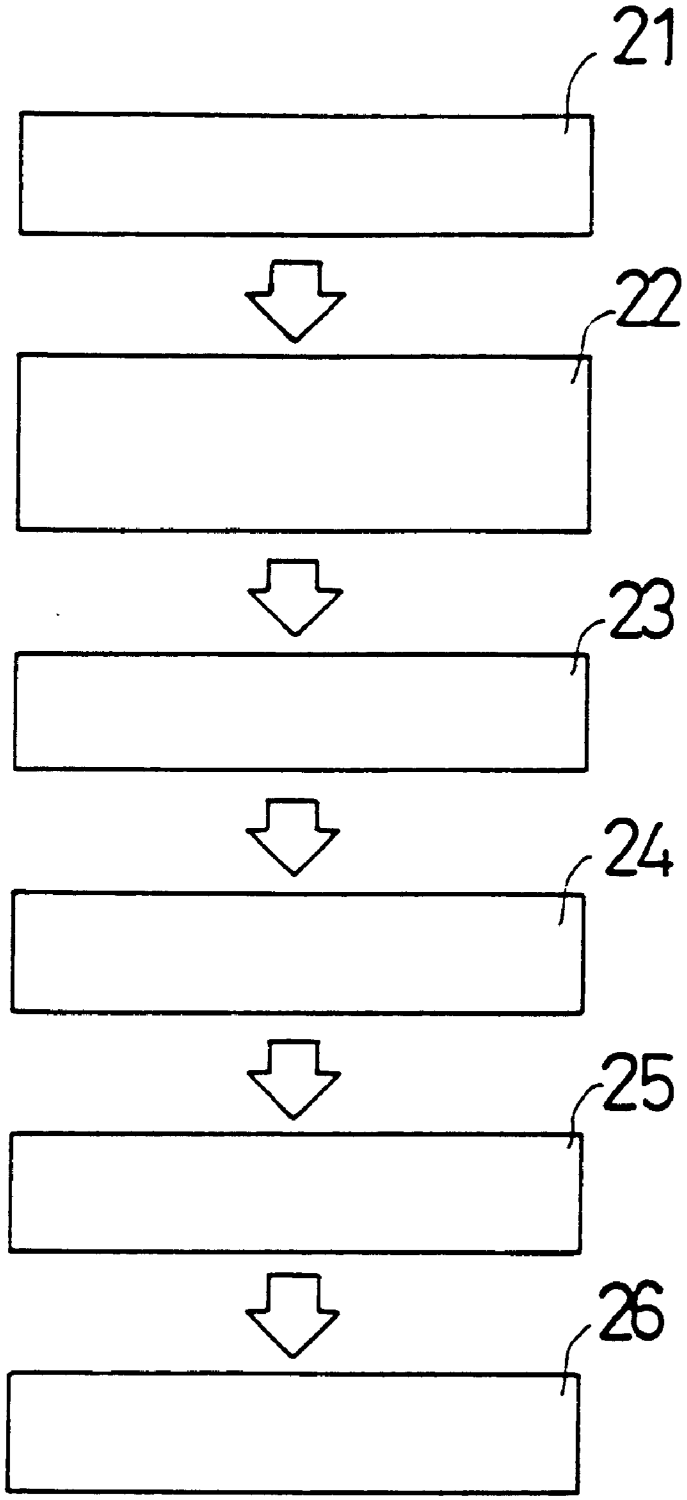
FIG. 1 is a flow chart of the present invention.

Please refer to FIG. 1. The method for manufacturing knockdown safety soft floor tile according to the present invention includes the following steps:

First step 21: preparing an EVA board having a surface formed with irregular slipproof stripes (or a plane surface) and preparing a transfer printing paper, wherein "EVA" means ethylene-vinyl acetate copolymer.

Second step 22: using a chemical solvent consisting of 40% (according to volume concentration) toluene, 30% butanone and 30% cyclohexanone to clean up the oil layer on the surface of the EVA board and then with photography printing the predetermined picture on the transfer printing paper. The picture can be the grain of teak or walnut or the stripes of marble or limestone or a sight or cartoon character or even a singular.

Third step 23: planely attaching the transfer printing paper with the picture to the surface of the EVA board.

Fourth step 24: rolling and compressing the transfer printing paper with a high temperature roller for enhancing the adhesion of the picture to the surface of the EVA board, wherein the high temperature is within about 150 to 190 degrees C. However, this range can be changed according to the property of the transfer printing paper.

Fifth step 25: tearing away the transfer printing paper and leaving the picture on the EVA board.

Sixth step 26: cutting the EVA board into predetermined dimension as a product.

Alternatively, in the second step 22, the solvent can consist of 30% toluene, 25% butanone, 25% cyclohexanone and 20% resin.

Alternatively, instead of the chemical solvent, an air nozzle can be employed (not shown) to inject high pressure air and fine grinding granules (or fine sands) onto the surface of the EVA board so as to remove the oil layer.

Figure 2:
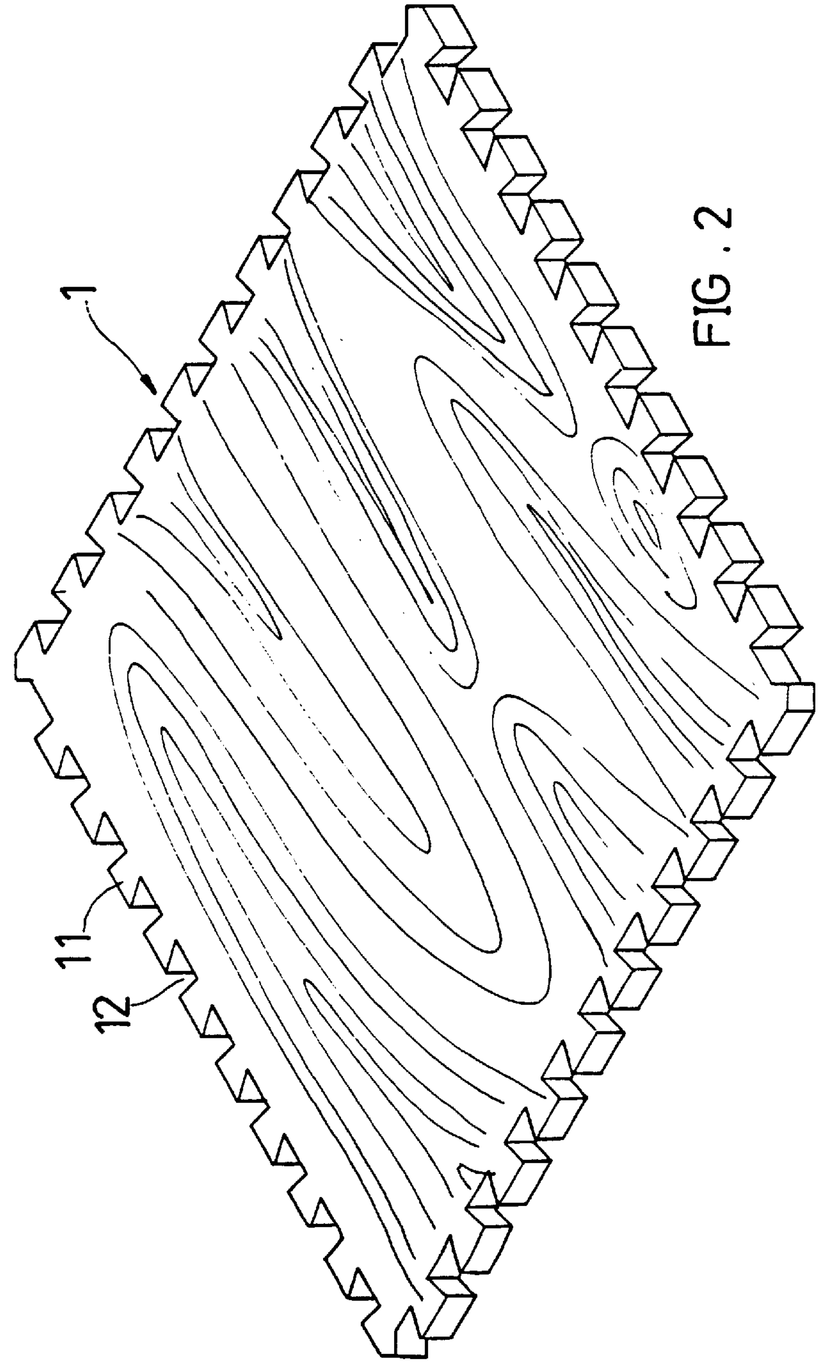
FIG. 2 is a perspective view of the floor tile product of the present invention.

FIG. 2 shows the floor tile product made by the above method. The floor tile 1 is rectangular and each side of the floor tile is formed with recesses 11 and projections 12 for mating with those of an adjacent floor tile.

Figure 3:
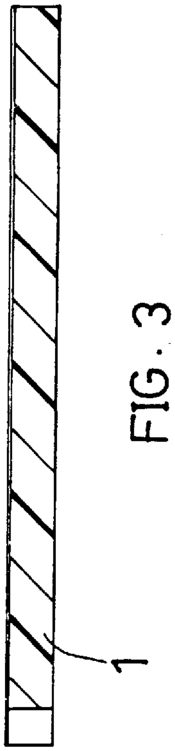
FIG. 3 is a sectional view of the floor tile product of the present invention; and, FIG. 4 shows the assembly of the floor tiles of the present invention.
Figure 4:
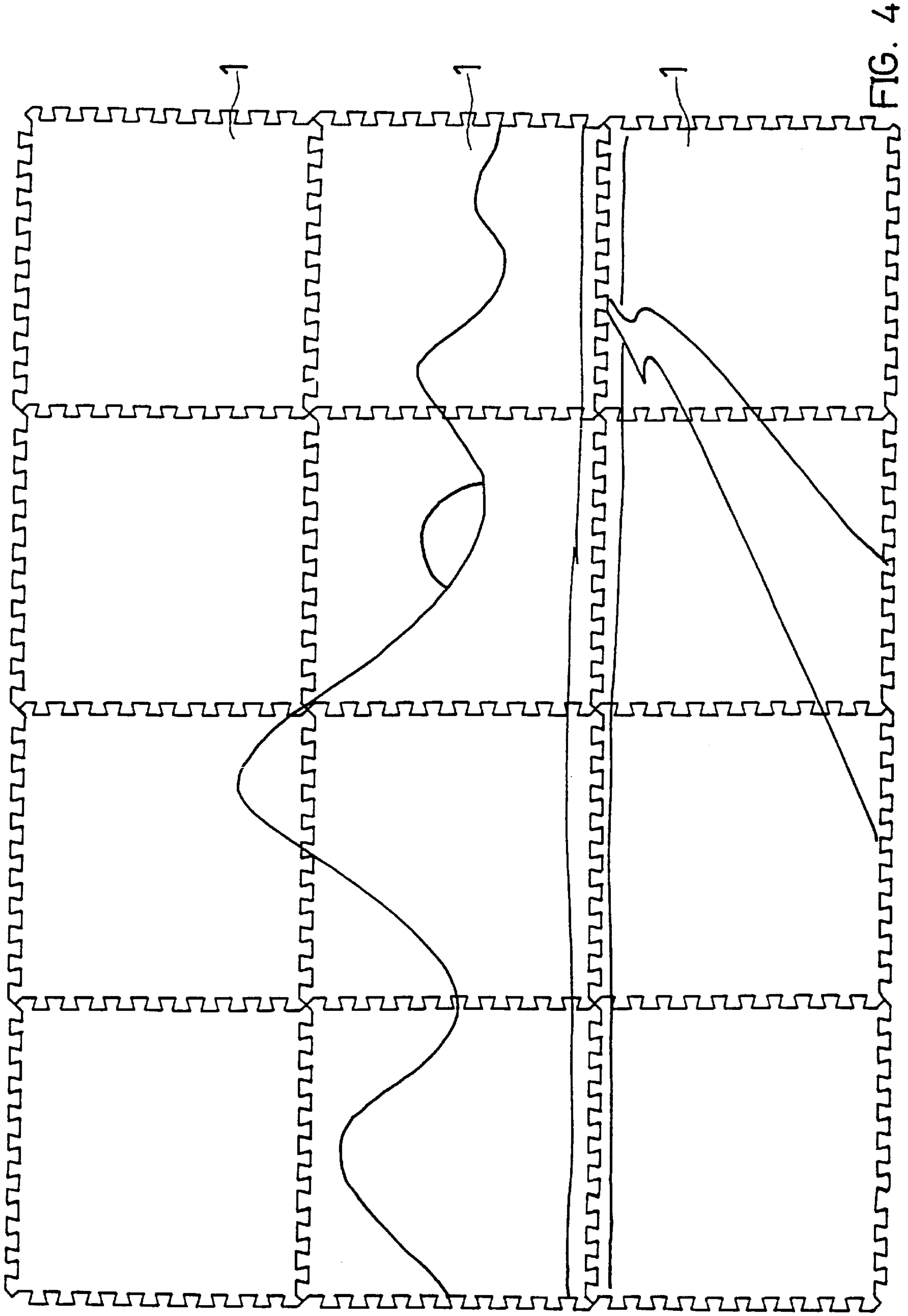

Referring to FIG. 3, multiple floor tiles 1 can be assembled into a large area of floor tile in accordance with the size of the room.

It should be noted that the EVA board is made of a foam material and after it is produced, a special oil layer will remain on the surface of the EVA board. Such oil layer can not be easily cleaned up with clean water or soap water. Without previously removing the oil layer, the transfer printing operation will lead to a very poor effect.

Therefore, it is the most important thing to remove the oil layer of the surface of the EVA board. According to the present invention, the oil layer is dissolved and removed by a specifically composed chemical solvent or high pressure air or sands. Furthermore, in cooperation with the high temperature roller which compresses the transfer printing paper, the picture can be securely printed on the EVA board without detachment.

Figure 5:
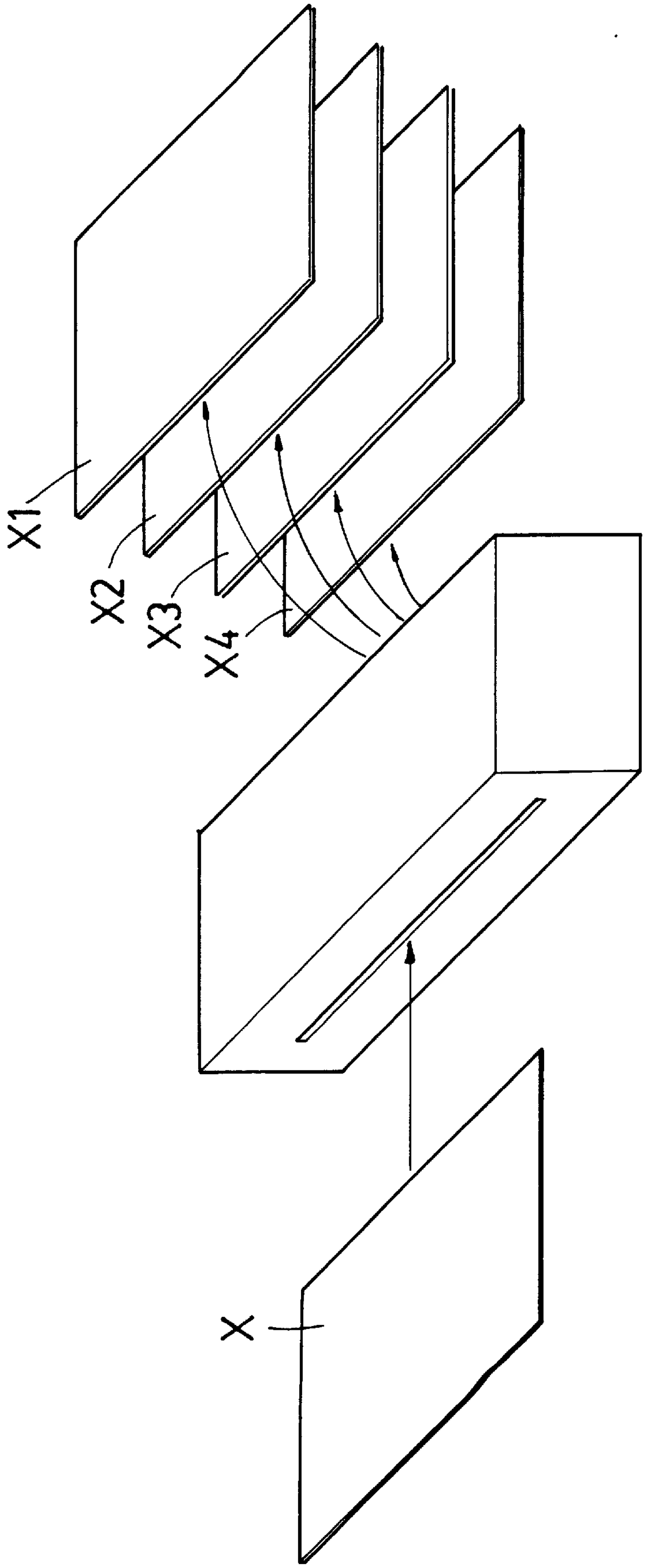
FIG. 5 PRIOR ART
FIGS. 5 and 6 show the steps of printing a picture on a transfer printing paper.
Figure 6:
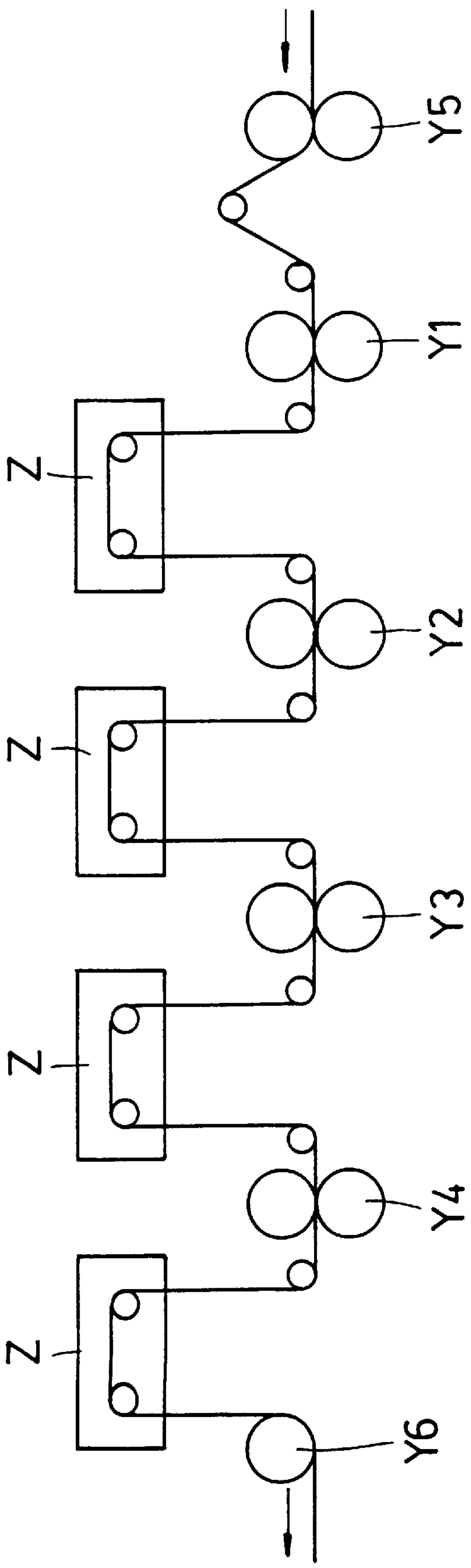
FIG. 6 PRIOR ART

With regard to the use of "photography" to print a picture on a transfer printing paper, such is a well known technology, the detailed steps are described as follows, with reference to FIGS. 5 and 6:

(a) to obtain a color picture X;

(b) to prepare a transfer printing paper and it has a working surface (in this case, the working surface is facing down);

(c) using a traditional color separating technique and device (not shown), to obtain a red, yellow, blue and black single-color pictures X1, X2, X3, X4, from the color picture X, shown in FIG. 5;

(d) using a traditional computer-controlled sculpturing device (not shown), to sculpture these four pictures X1, X2, X3, X4 on the surfaces of four corresponding printing rollers Y1, Y2, Y3, Y4 so that every printing roller can print out one single color;

(d) referring to FIG. 6, the transfer printing paper passes through a roller Y5 for providing a traditional mold-separating agent to form a thin film on the working surface of the transfer printing paper;

(e) the transfer printing paper passes through the red printing roller Y1 so that a red picture is printed on the film of the working surface and then passes through a hot air blower Z (make the red painted dry);

(f) repeat the procedure like step (e) for printing the yellow, blue and black pictures respectively;

(g) the transfer printing paper finally passes a roller Y6 to stick a glue layer on the working surface of the transfer printing paper, so that a picture is printed on the transfer printing paper.

The safety soft floor tiles of the present invention can be assembled by a purchaser himself, without the expense of a contractor. The soft property of the EVA material protects a user from being injured in case the user falls down.

Moreover, the picture of the floor tile of the present invention is changeable according to the requirement of the user. For example, when laid on the floor of a kid garden or infant room, the picture can be a cartoon or fairy tale picture. When laid on the floor of a room of an old-timer, the picture can be the grain of teak or stripes of specific stone.

In addition, the EVA material has other advantages such as low cost, noise-absorbing, keeping warm, easy washing and easy storage. In case of contamination, the floor tiles can be totally or partially disassembled for washing. Also, when not used, the knockdown floor tiles can be disassembled, stacked and stored by the user himself without occupying much room.

It is to be understood that the above description and drawings are only used for illustrating one embodiment of the present invention, but not intended to limit the scope thereof. Any variation and derivation from the above description and figures should be included in the scope of the present invention.

What is claimed is:

1. A method for manufacturing knockdown safety soft floor tile, said method comprising the steps of:

(a) preparing an ethylene-vinyl acetate (EVA) board having an upper surface and preparing a transfer printing paper;

(b) cleaning said upper surface of said EVA board to remove an oil layer therefrom;

(c) using photographic process to print a predetermined picture on a transfer printing paper;

(d) attaching the transfer printing paper with the picture to said upper surface of said EVA board;

(e) rolling and compressing the transfer printing paper together with said EVA board with a high temperature roller;

(f) tearing away the transfer printing paper and leaving the picture on said EVA board; and, (g) cutting said EVA board to have predetermined dimensions defining a floor tile product of rectangular shape, and forming each side of the floor tile with recesses and projections for mating with those of an adjacent floor tile.

2. The method as claimed in claim 1 where said step of cleaning said surface of said EVA board includes the step of applying a chemical solvent consisting of 40% toluene, 30% butanone and 30% cyclohexanone to remove the oil layer.

3. The method as claimed in claim 1 where said step of cleaning said upper surface of said EVA board includes the step of applying a chemical solvent consisting of 30% toluene, 25% butanone, 25% cyclohexanone and 20% resin to remove the oil layer.

4. The method claimed in claim 1, where said step of cleaning said upper surface of said EVA board includes the step of using a nozzle to inject high pressure air and fine grinding granules onto said upper surface of the EVA board so as to remove the oil layer thereon.

5. The method as claimed in claim 1 where said step of rolling and compressing includes the step heating said high temperature roller to a temperature within an approximating range of 150 to 190 degrees C.

6. The method as claimed in claim 1 where the step of preparing an EVA board includes the step providing said upper surface of said EVA board with irregular slipproof stripes.

* * * * *